Sept. 30, 1952  E. LARSON  2,611,989
ANIMAL TRAP
Filed Oct. 19, 1946  2 SHEETS—SHEET 1
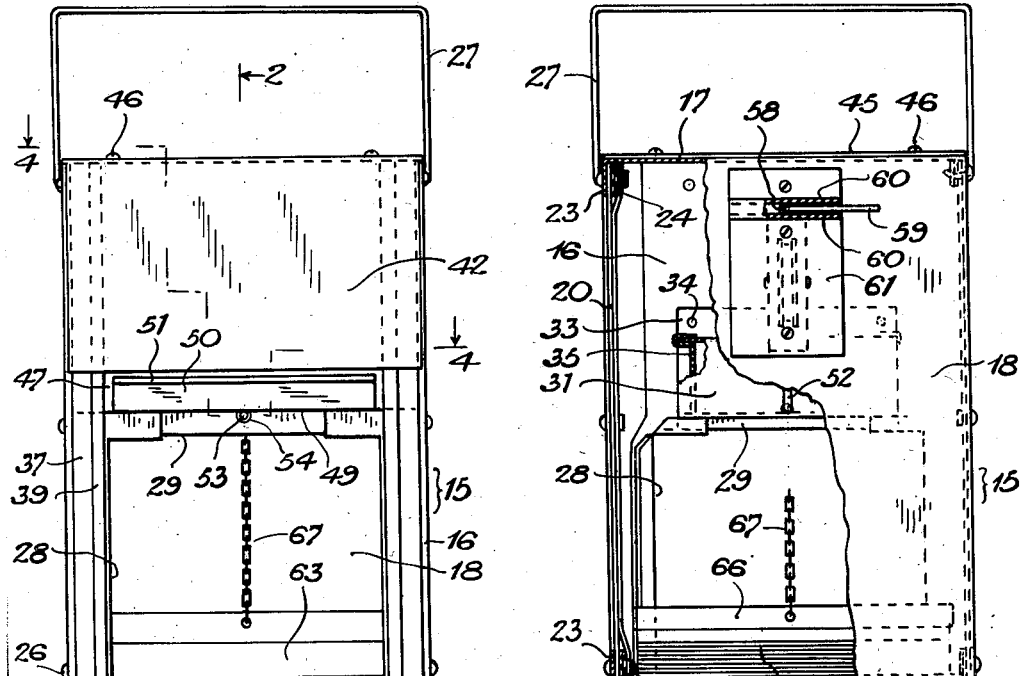
FIG. 1
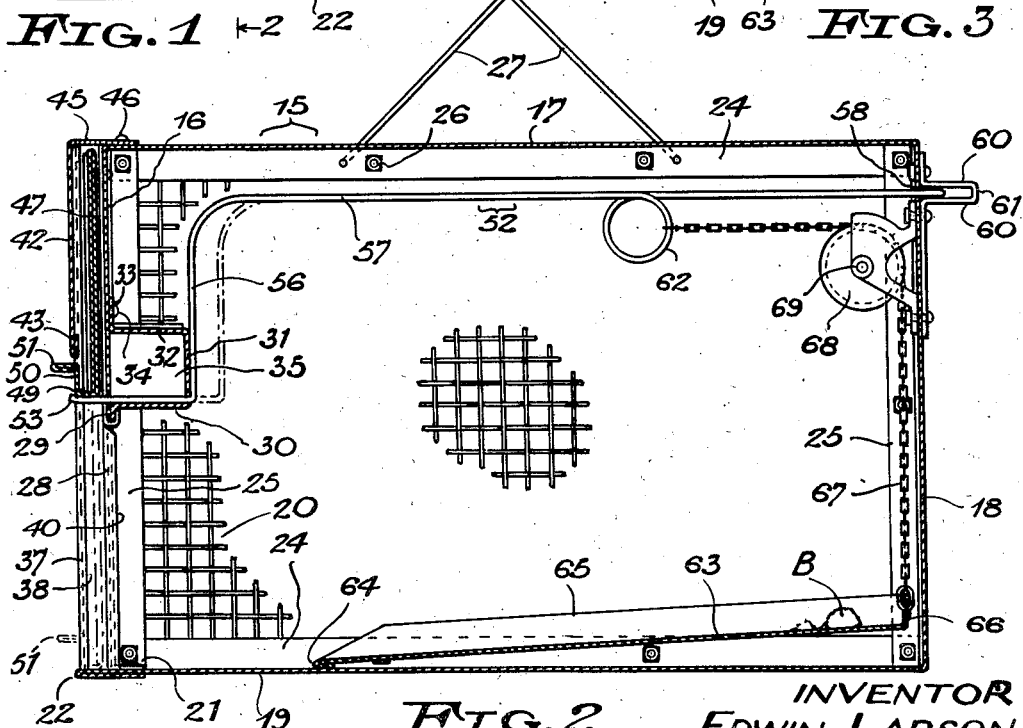
FIG. 3
FIG. 2
INVENTOR
EDWIN LARSON
BY Christopher L. Waal
ATTORNEY

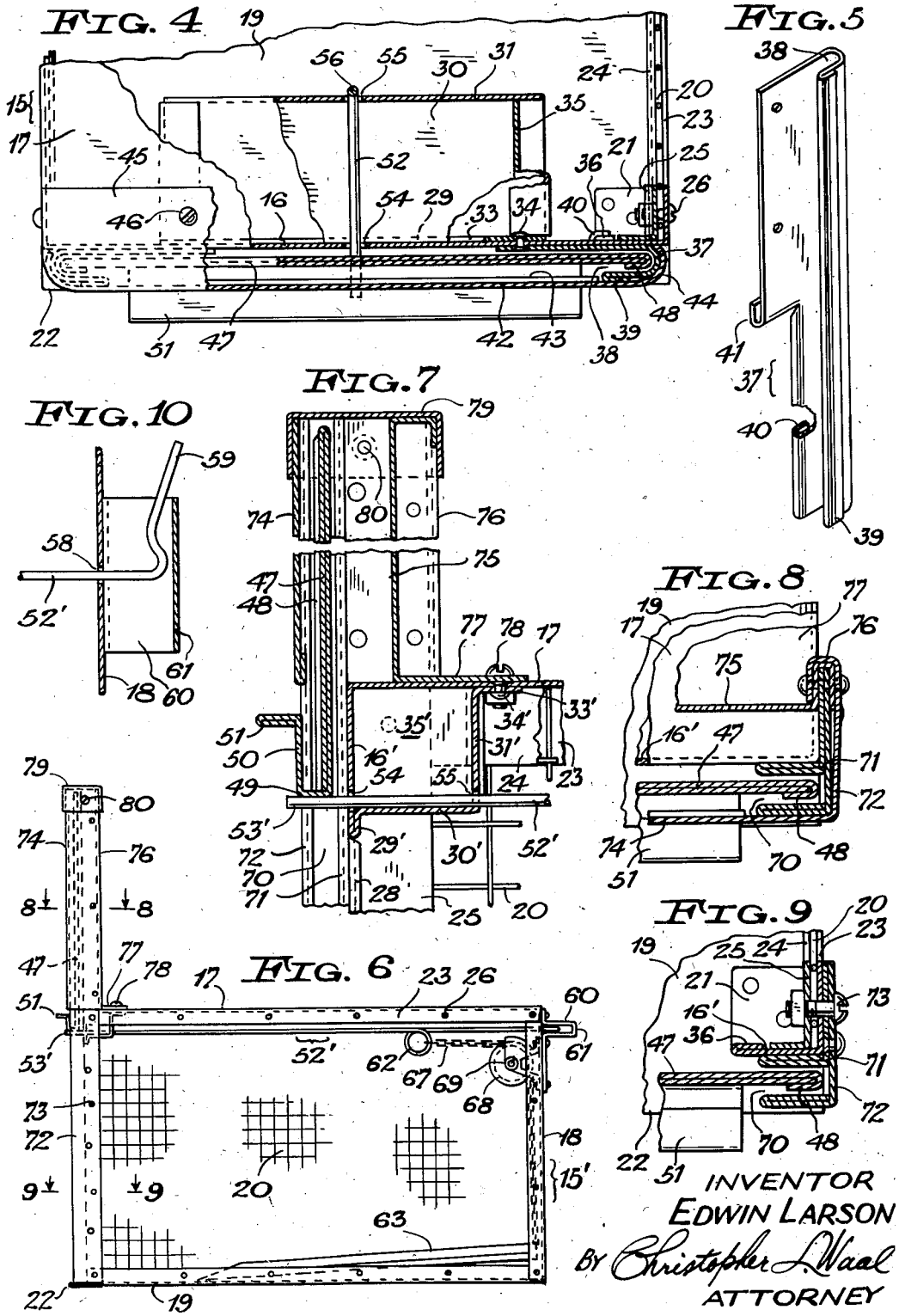

Patented Sept. 30, 1952

2,611,989

UNITED STATES PATENT OFFICE 2,611,989

ANIMAL TRAP

Edwin Larson, Milwaukee County, Wis.

Application October 19, 1946, Serial No. 704,449

2 Claims. (Cl. 43—61)

The present invention relates to animal traps, and more particularly to traps of the imprisoning type with a movable closure.

An object of the invention is to provide an improved trap for humanely catching various animals, such as rabbits, squirrels, rats, cats, and opossums, and also birds.

Another object is to provide a simple and inexpensive trap which is reliable in operation and which can be baited and set easily and safely, even by children.

A further object is to provide a trap which will remain operative when exposed to inclement weather, and which can be easily and thoroughly cleaned, as by a water bath, without damaging the mechanism.

The invention further consists in the several features hereinafter described and claimed.

In the accompanying drawings, illustrating certain embodiments of the invention, Fig. 1 is a front end view of an animal trap constructed in accordance with the invention, the door or closure being open;

Fig. 2 is a longitudinal sectional elevational view of the trap taken generally along the line 2—2 of Fig. 1, an open position of the door being shown in full lines and a closed position in broken lines;

Fig. 3 is a rear end view of the trap, parts being broken away and parts being shown in section;

Fig. 4 is a sectional view of the front end portion of the trap, taken generally along the line 4—4 of Fig. 1;

Fig. 5 is a perspective view of a door guide of the trap, parts being shown in section;

Fig. 6 is a side elevation of a modified form of trap, the door being open;

Fig. 7 is a detail sectional elevation of the entrance portion of the trap, the door being set in open position;

Fig. 8 is a detail sectional view taken on the line 8—8 of Fig. 6;

Fig. 9 is a detail sectional view taken on the line 9—9 of Fig. 6, and

Fig. 10 is a detail sectional view of a trip rod mounting at the rear end of the trap.

Referring to the form of trap shown in Figs. 1 to 5, 15 designates a rectangular casing having a front wall 16, top wall 17, rear wall 18, bottom wall 19, and side walls 20, the latter being formed by panels of wire screening. The front, top, rear, and bottom walls are parts of a length or strip of sheet metal, such as galvanized steel, bent to form a rectangular loop, the front wall having at opposite sides inturned bottom ears 21 riveted or otherwise rigidly secured to the front end of the bottom wall. The front end of the bottom wall projects forwardly of the front wall and is reversely folded at 22 to form a stiff rounded edge. The sides of the sheet metal strip have inturned flanges 23 which are rigidly secured together in overlapping relation at the corners of the casing. The screen side panels are confined at the inner sides of the flanges 23 by horizontally extending top and bottom clamping bars 24 and vertically extending angle bars 25, the flanges and bars being clamped to the intervening edge portions of the screen panels, as by screws 26. The casing is here shown to be provided with a pair of pivoted carrying bails 27.

The front wall 16 of the casing has a central doorway 28 at its lower half formed by cutting in the lower part of the wall panel a parallel-sided tongue which is bent rearwardly and upwardly to form in succession a doubled edge 29 at the upper edge of the doorway, a rearwardly extending horizontal guide wall 30, a vertical stop wall 31, a horizontal forwardly projecting wall 32, and an upwardly projecting flange 33 which is secured by rivets 34 to the rear face of the front wall 16, the ends of the box-like structure thus formed being closed by panels 35 to prevent entrance of mice and other small animals. The doorway has inwardly folded side edge portions 36. Along the opposite side portions of the front wall 16 are riveted or otherwise secured vertical door guides 37 formed by sheet metal strips (one being shown in Fig. 5) bent to present opposed channels or trackways 38, the outer edges of the strips being reversely folded at 39 for stiffening and elimination of sharp edges. The rear edges of the guide strips have reversely bent vertical and horizontal flanges 40 and 41 embracing the edges of the doorway opening. The door guides are enclosed at their upper portions by a wind shield or housing 42 having a vertical front wall with a reversely folded lower edge 43, the housing further having channel side edges 44 slidably embracing the outer edges of the door guides 37, and a top panel or flange 45 which is secured, as by screws 46, to the top wall 17 of the casing.

A door 47 is vertically slidable in the guides 37 and comprises a piece of sheet metal doubled on itself, the side edges 48 of the inner panel being folded to embrace the edges of the outer panel. The lower part of the inner panel is of reduced width and is bent forwardly and upwardly to form in succession a flat bottom 49, an upwardly extending web 50, and a forwardly projecting lifting lip 51 higher than the bottom, the lip being reversely folded.

The door 47 is closed by gravity and is releasably held in its elevated open position by a generally horizontal trigger rod or trip rod 52 which extends centrally and longitudinally of the casing and is slidably mounted in the front and rear walls of the casing. The flat lower edge of the door rests on the front end 53 of the rod to support the door in open position. In some instances, the front end of the rod has a slight upward inclination. The rod slidably rests on the horizontal guide wall 30 and passes through small guide openings 54 and 55, Fig. 4, formed in the front casing wall 16 and the vertical stop wall 31. The rod has a short vertical stop portion 56 engageable with the rear face of the guide wall to limit the forward movement of the rod, and a long horizontal portion 57 which passes through a guide opening 58 formed in the upper portion of the rear casing wall 18, the rear end of the rod being laterally bent to form an actuating finger 59 which is slidably confined between horizontal slot-forming walls 60 of a sheet metal guide bracket 61 secured to the rear face of the casing rear wall, thus preventing turning of the rod and guarding the bent rear end of the rod. The horizontal portion 57 of the rod has a downwardly projecting circular loop 62 spaced forwardly from the rear wall of the casing.

A sheet metal platform 63 is loosely disposed in the lower part of the casing 15 and has a folded front edge 64 resting in fulcrumed relation on the bottom wall of the casing near the front of the bottom wall. The platform has upstanding side and rear flanges 65 and 66 and slopes upwardly toward the rear of the casing at a small angle. The rear end of the platform is near the rear wall of the casing and is suspended by a flexible string-like elements 67, preferably a chain, one end of which is fastened to the rear flange 66 of the platform. The chain passes over a pulley 68 mounted on a bracket 69 secured to the upper portion of the rear wall of the casing, and the upper end portion of the chain extends forwardly from the pulley and is fastened to the loop 62 of the trigger rod. The contact surfaces of the movable parts of the trap may be suitably lubricated, as by rubbing graphite on these surfaces.

In setting the trap, the door 47 is lifted by its lip 51 and the slidable trigger rod 52 is pushed forwardly by its rear finger 59 to bring the front end 53 of the rod under the lower edge 49 of the door. The door is then slightly lowered onto the rod end 53 to support the door in open position, as seen in Fig. 2, the rod being retained in this position by the slight frictional engagement between the relatively slidable parts. This manipulation raises the fulcrumed chain-suspended platform 63 through a small angle. A suitable bait B is placed on the platform either at this stage or before the trigger rod is set. It will be seen that the setting of the trap is very simple and safe, even for children, and involves no critical adjustments. An animal attracted by the bait enters the casing through the open doorway and depresses the platform, thus retracting the trigger rod and permitting the door to drop by gravity to its closed position for imprisoning the animal. Even if the weight of the animal is insufficient to depress the platform the movements of the animal on the platform will cause gradual sinking of the platform and eventual closing of the door, as the platform is retained in raised position by the slight friction between the trigger rod and the surfaces in contact with the rod. In the case of birds, the act of pecking at the bait will cause sinking of the platform and closing of the door. The imprisoned animal may sit or stand in the casing without disturbing the trigger rod which is close to the top wall of the casing. The door is shielded by the housing 42 against the action of wind, so as to avoid accidental springing of the trap. Also, the moving parts are shielded from the weather. If a rat or other noxious animal is caught in the trap, the animal can be drowned by immersing the entire trap in water without damage to the trap. The trap is easily cleaned by flushing it out with water, without causing injury to the trap. The entire floor of the trap can be thoroughly cleaned as the platform is loosely suspended in the casing and can readily be swung completely off the floor and to one side, as rolling the trap sideways.

The modified form of trap shown in Figs. 6 to 9 is generally similar to the trap of Fig. 1 but is suitable for larger animals, such as raccoons. The modified trap comprises a rectangular casing 15' like the casing 15, except that the front wall 16' thereof has a doorway 28' which is nearly as high as this wall, a central tongue of the front wall being bent rearwardly and upwardly to form in succession a folded edge 29', a horizontal guide wall 30', a vertical wall 31', and a horizontal flange 33' which is secured to the bottom face of the top wall 16, as by rivets 34'. The ends of the box-like structure thus formed are closed by panels 35'. A trigger rod 52', generally similar to the rod 52, is slidably mounted in the casing in the same manner as the rod 52 and has a front end 53' for supporting a vertically slidable door 47. The rod end 53' is substantially aligned with the main body of the rod, as seen in Fig. 6. The trigger rod is connected to a fulcrumed platform 63 as in the device of Fig. 2. The door 47 is slidably guided in opposed vertical channels 70 formed by pairs of vertically extending angle bars 71 and 72 secured, as by screws 73, to the flanges 23 at the front edges of the casing side walls, each pair of angle bars being riveted or otherwise secured together and projecting above the plane of the top wall 17 of the casing. The angle bars may be formed of sheet metal angle strips with reversely folded edges along their channel-forming flanges. Above the casing top wall the angle bars are enclosed in a sheet metal door housing which extends between the spaced bars and comprises a front panel 74 and a rear panel 75 which have folded connections 76, Fig. 8, at the rear edges of the bars, the rear panel further having a horizontal flange 77 which is secured to the casing top wall 17, as by screws 78. The top of the door housing is enclosed by a skirted cap 79 secured to the housing, as by screws 80. The trap of Fig. 6 is otherwise the same as that of Fig. 2 and operates in the same manner.

What I claim as new and desire to secure by Letters Patent is:

1. In an animal trap, an enclosure having an entrance, a door for said entrance movable to open and closed positions and gravitationally urged toward closed position, a longitudinally shiftable trip rod slidably supported and guided at opposite end portions by said enclosure, one of said end portions releasably supporting said door in open position and the other end portion forming an actuator exposed at the exterior of said enclosure for manually shifting said rod to door-supporting position, said actuator end of the rod being laterally bent, an exterior guide bracket on said enclosure having a guide slot receiving the bent end of the rod, an animal-depressible platform at the lower portion of said enclosure, and means operatively connecting said platform and trip rod for shifting said rod out of door-supporting position.

2. In an animal trap, an enclosure having an entrance, a movably mounted door for said entrance urged toward closed position, an animal-depressible platform at the lower portion of said enclosure, a longitudinally shiftable trip rod for supporting the door in open position, spaced guide means for slidably supporting the opposite end portions of said trip rod, said trip rod being bent to form an intermediate loop between said guide means, and means for supporting said platform from said loop to shift said rod longitudinally out of door-supporting position upon the depression of said platform, said platform-supporting means including a flexible supporting member connected to said loop.

EDWIN LARSON.

REFERENCES CITED

The following references are of record in the file of this patent:

UNITED STATES PATENTS

| Number | Name | Date |
|---|---|---|
| 54,241 | Wolf | Apr. 24, 1866 |
| 443,975 | Pead | Dec. 30, 1890 |
| 472,687 | Winkler | Apr. 12, 1892 |
| 1,011,207 | Kemp | Dec. 12, 1911 |
| 1,303,736 | Speicher | May 13, 1919 |
| 1,453,795 | Hovell | May 1, 1923 |
| 1,654,434 | Senecal | Dec. 27, 1927 |
| 1,747,108 | Evans | Feb. 11, 1930 |
| 1,844,739 | Austin | Feb. 9, 1932 |
| 1,990,861 | Exum | Feb. 12, 1935 |
| 2,038,068 | Wagner | Apr. 21, 1936 |
| 2,087,646 | Houghton | July 20, 1937 |
| 2,155,544 | Harlow | Apr. 25, 1939 |
| 2,188,652 | Cress | Jan. 30, 1940 |
| 2,235,483 | Jacobs | Mar. 18, 1941 |